United States Patent [19]

Yasuda et al.

[11] Patent Number: 4,944,988

[45] Date of Patent: Jul. 31, 1990

[54] INK JET RECORDING SHEET AND PROCESS FOR PRODUCING SAME

[75] Inventors: Kenji Yasuda, Yachiyo; Akira Kobayashi, Kasugai; Makiko Tokita, Chiba; Masao Maekawa, Kitakatsuragi; Masahiko Kitajima, Izumi; Hisao Maruyama, Toyonaka, all of Japan

[73] Assignee: OJI Paper Co., Ltd., Tokyo, Japan

[21] Appl. No.: 291,032

[22] Filed: Dec. 28, 1988

[30] Foreign Application Priority Data

Dec. 29, 1987 [JP] Japan ................................ 62-334054

[51] Int. Cl.$^5$ ................................................ B32B 9/00

[52] U.S. Cl. .................................... 428/195; 428/200; 428/201; 428/204; 428/206; 428/207; 428/219; 428/323; 428/331; 428/913; 427/138

[58] Field of Search ............... 428/195, 200, 201, 204, 428/206, 207, 219, 323, 331, 913; 427/138

[56] References Cited

U.S. PATENT DOCUMENTS

| | | | |
|---|---|---|---|
| 4,371,582 | 2/1983 | Sugiyama et al. | 428/511 |
| 4,517,244 | 5/1985 | Kobayashi et al. | 428/342 |
| 4,554,181 | 11/1988 | Cousin et al. | 428/470 |
| 4,578,285 | 3/1986 | Viola | 428/483 |
| 4,592,958 | 6/1986 | Mossor et al. | 428/470 |
| 4,636,805 | 1/1987 | Toganoh et al. | 428/511 |
| 4,680,235 | 7/1987 | Murakami et al. | 428/704 |
| 4,720,480 | 1/1988 | Ito et al. | 428/913 |
| 4,740,420 | 4/1988 | Akutsu et al. | 428/474.4 |
| 4,783,376 | 11/1988 | Sakaki et al. | 428/513 |
| 4,785,313 | 11/1988 | Hisuma et al. | 346/1.1 |
| 4,801,497 | 1/1989 | Kono et al. | 428/211 |

FOREIGN PATENT DOCUMENTS

| | | |
|---|---|---|
| 5051583 | 10/1979 | Japan . |
| 6084992 | 4/1980 | Japan . |
| 8048458 | 9/1981 | Japan . |
| 2011678 | 1/1987 | Japan . |
| 6283178 | 4/1987 | Japan . |

*Primary Examiner*—Patrick Ryan

*Attorney, Agent, or Firm*—Armstrong, Nikaido, Marmelstein, Kubovcik & Murray

[57] ABSTRACT

An ink jet recording sheet having an enhanced ink-absorbing property and bright color image-forming property and an excellent surface hardness has a specific coating layer formed on a surface of a substrate sheet, which comprises a pigment and a resinous binder composed of a cationic copolymer prepared by copolymerizing (a) 99.95 molar % or less of a principal copolymerization component comprising at least one fatty acid vinyl ester comonomer with (b) 0.05 to 0.4 molar % of a cationic copolymerization component comprising at least one cationic comonomer having an ethylenically unsaturated hydrocarbon radical and a cationic radical selected from tertiary amino radicals and quaternary ammonium radicals and, optionally, a member selected from (c) an additional copolymerization component comprising at least one polymerizable non-ionic comonomer different from the fatty acid vinyl ester and (d) a graft copolymerization component comprising polyvinyl alcohol.

15 Claims, No Drawings

INK JET RECORDING SHEET AND PROCESS FOR PRODUCING SAME

BACKGROUND OF THE INVENTION

1. Field of the Invention

The present invention relates to an ink jet recording sheet and a process for producing the same. More particularly, the present invention relates to an ink jet recording sheet for recording images and letters formed by jetting an aqueous ink containing a water-soluble dye, and a process for industrially producing the same.

2. Description of Related Art

It is known that a recording sheet for forming a hard copy having a high quality, in accordance with an ink jet recording method, is provided by coating a surface of a substrate sheet, for example, a paper sheet, with a coating composition comprising a pigment and a resinous binder to form a coating layer which allows small drops of an aqueous ink jetted on the surface of the coating layer to rapidly penetrate into the coating layer in a direction at right angles to the surface of the coating layer without spreading on the surface of the coating layer, to form clear images consisting of a number of dots on the coating layer surface.

For example, Japanese Unexamined Patent Publication (Kokai) No. 55-51583 (1980) discloses an ink jet recording sheet having a coating layer formed on a substrate sheet surface and comprising non-gelatinous silica particles having a size of from 0.1 to 10 μm and a resinous binder.

Also, Japanese Unexamined Patent Publication (Kokai) No. 56-145856 (19,81) discloses an ink jet recording sheet having an ink-receiving layer formed on a substrate sheet and comprising a mixture of fine silicic acid particles and a resinous binder soluble in a non-aqueous solvent or a mixture of fine silicic acid particles, other inorganic pigment particles, and a resinous binder soluble in a non-aqueous solvent.

The above-mentioned conventional ink jet recording sheets are disadvantageous in that the coating layer has an unsatisfactory mechanical strength and, therefore, the surface strength of the coating layer does not reach a required level, and thus the color-developing property for the aqueous ink and the resolving power of the coating layer are not always satisfactory.

Where the ink-absorbing property, resolving power and color-developing properties of the conventional coating layer must be enhanced, the content of the ink-absorbing pigment, such as silica, in the coating layer must be increased, and the amount of the coating layer must be also increased. The above-mentioned requirements make it difficult to enhance the mechanical strength of the coating layer.

Further, Japanese Unexamined Patent Publication (Kokai) No. 62-83178 (1987) discloses an ink jet recording sheet having a coating layer formed on a substrate sheet surface, comprising, as a principal component, a mixture of fine silicic acid particles and a cationic emulsion polymer and exhibiting improved mechanical strength and a high quality image-forming property. Nevertheless, the conventional recording sheet having the above-mentioned, improved coating layer still does not always absorb the aqueous ink at satisfactory high speed, nor dies it always have a high surface strength of the coating layer. Further, the images or letters formed by the aqueous ink are disadvantageous in that they have a poor resistance to water.

To provide water-resistant images or letters on a recording sheet, Japanese Examined Patent Publication (Kokoku) No. 62-11678 (1987) discloses a coating layer containing, as a resinous binder, a water-insoluble copolymer having 10 to 90 molar % of ethylenically unsaturated cationic comonomer. Also, Japanese Unexamined Patent Publication (Kokai) No. 56-84992 (1981) discloses a recording sheet having a coating layer which contains a water-soluble, polycationic, electrolytic polymer. However, the above-mentioned conventional coating layer containing the cationic, water-insoluble polymer has an unsatisfactory ink-absorbing speed and resolving power. Also, the water resistance of the resultant images on the coating layer is poor, the cationic polymer in the coating layer exhibits a poor resistance to weather, and the color of the coating layer is discolored yellow with a lapse of time.

The water resistance of images can be enhanced only by using a water-soluble cationic polymeric compound. This water-soluble cationic polymeric compound can be utilized together with the water-insoluble cationic copolymer containing, as a copolymerization component, a fatty acid vinyl ester comonomer, to enhance the water resistance of images, the ink-absorbing property, and the resolving property of the coating layer.

Japanese Unexamined Patent Publication (Kokai) No. 62-83178 (1987) and Japanese Examined Patent Publication (Kokoku) No. 62-11678 (1987) disclose specific water-insoluble, cationic polymers for forming the coating layer of the recording sheet, but since these cationic polymers, which are usually in the form of an aqueous emulsion, have a high cation density when used in the preparation of a coating liquid or in a produce for the coating thereof, and the pigment particles, for example, silica particles, have a negative charge, it is practically difficult to provide a coating liquid by evenly dissolving the cationic polymer in water in the presence of the pigment and evenly dispersing the pigment particles in the cationic polymer solution. Also, in the preparation of the coating liquid, sometimes the viscosity of the resultant coating liquid is undesirably increased or the coating liquid is coagulated, and thus the coating and drying procedures become unstable.

Accordingly, a strong demand has arisen for a new type of ink jet recording sheet which can absorb ink in a satisfactory amount at a high speed and form clear color images of ink dots with a high resolving power, and exhibit an enhanced surface strength and satisfactory practical handling properties, for example, processing, printing, cutting and writing properties, and for a new type of process for producing the ink jet recording sheet by using a coating liquid having an improved coating property and stability.

SUMMARY OF THE INVENTION

An object of the present invention is to provide an ink jet recording sheet having an improved ink-absorbing property, color image-forming property, surface strength, and processing property, and a process for producing the same at an enhanced efficiency.

Another object of the present invention is to provide an ink jet recording sheet having a coating sheet formed on a surface of a substrate sheet and comprising a pigment and various water-soluble cationic polymeric substances mixed into a water-insoluble or water soluble resinous binder, and a process for producing the same.

The above-mentioned objects can be attained by the ink jet recording sheet of the present invention which comprises: a substrate sheet, and at least one coating layer formed on at least one surface of the substrate sheet and comprising a resinous binder and at least a pigment dispersed in the resinous binder, the resinous binder comprising at least one cationic copolymer which is a copolymerization product of:

(a) 99.95 molar % or less of a principal copolymerization component comprising at least one fatty acid vinyl ester comonomer; with at least (b) 0.05 to 0.4 molar % of a cationic copolymerization component comprising at least one cationic comonomer having at least one ethylenically unsaturated hydrocarbon radical and at least one cationic radical selected from the group consisting of tertiary amino radicals and quaternary ammonium radicals.

The above-mentioned ink jet recording sheet is produced by a process of the present invention which comprises the steps of: coating at least one surface of a substrate sheet with an aqueous coating liquid containing a resinous binder and a pigment, and dry-solidifying the resultant layer of the aqueous coating liquid to provide a coating layer on the substrate sheet surface, the resinous binder comprising at least one cationic copolymer which is a copolymerization product of:

(a) 99.95 molar % or less of a principal copolymerization component comprising at least one fatty acid vinyl ester comonomer; with at least (b) 0.05 to 0.4 molar % of one cationic radical selected from the group consisting of tertiary amino radicals and quaternary ammonium radicals.

The cationic copolymer optionally contains at least one member selected from the group consisting of (c) an additional copolymerization component comprising at least one polymerizable non-ionic comonomer different from the fatty acid vinyl ester comonomer, and (d) a graft copolymerization component comprising a polyvinyl alcohol, copolymerized with the principal and cationic copolymerization components.

DESCRIPTION OF THE PREFERRED EMBODIMENTS

The ink jet recording sheet of the present invention is characterized in that the coating layer comprises, as a resinous binder, a substantially water-insoluble cationic copolymer having a specific constitution as defined above.

The cationic copolymer contains a cationic copolymerization component in a low content, and thus the surfaces of the fine copolymer particles produced by, for example, an emulsion polymerization procedure, have a relatively low and preferable cationic potential. Therefore, when the pigment particles are mixed into the cationic copolymer, the resultant coating liquid is very stable and no coagulation of the coating liquid occurs. Therefore, the pigment particles can be evenly distributed in the coating liquid without an undesirable increase in viscosity and decrease in coating property, and the resultant coating liquid can be easily applied to the surface of the substrate sheet.

In the recording sheet of the present invention, at least one specific coating layer is formed in a weight of from 1 to 50 $g/m^2$, preferably from 1 to 10 $g/m^2$, on at least one surface of a substrate sheet.

The coating layer contains a resinous binder in an amount of 20% to 50%, preferably 20 to 35%, based on the weight of the coating layer.

The coating layer contains the specific cationic copolymer of the present invention in an amount of from 5 to 50%, preferably from 10 to 20%, based on the entire weight of the coating layer.

The cationic copolymer in the resinous binder is in a content of 10% to 100% by weight, preferably from 30% to 70% by weight.

In the coating layer of the recording sheet of the present invention, the cationic copolymer contained in the resinous binder is a copolymerization product of (a) 99.95 molar % or less, preferably 99.60 to 99.95 molar %, of a principal copolymerization component comprising at least one fatty acid vinyl ester comonomer; with at least (b) 0.05 to 0.4 molar %, preferably 0.1 to 0.4 molar % of a cationic copolymerization component comprising at least one cationic comonomer.

When the content of the cationic copolymerization component in the cationic copolymer is less than 0.05 molar %, the resultant coating layer exhibits an unsatisfactory color-developing property for images formed by a number of ink dots. Also, when the content of the cationic copolymerization component is more than 0.4 molar %, the resultant coating layer has an unsatisfactory ink-penetrating speed and ink-absorption amount and the color images formed by a number of ink dots on the coating layer become unclear.

The fatty acid vinyl ester comonomer usable for the principal copolymerization component of the cationic copolymer in the resinous binder is preferably selected from the group consisting of vinyl esters of fatty acids having 1 to 24 carbon atoms, for example, vinyl formate, vinyl acetate, vinyl monochloroacetate, vinyl propionate and other vinyl esters of fatty acids having 4 to 24 carbon atoms, for example, vinyl versatate. Particularly preferably fatty acid vinyl esters for the present invention are vinyl acetate, vinyl versatate, vinyl propionate and a mixture of the above-mentioned compounds.

The cationic polymerization component for the cationic copolymer comprises at least one cationic comonomer having at least one ethylenically unsaturated hydrocarbon radical and at least one cationic radical selected from tertiary amino radicals and quaternary ammonium radicals.

The cationic comonomer is preferably selected from the compounds of the formulae (I) and (II):

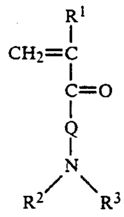
(I) and
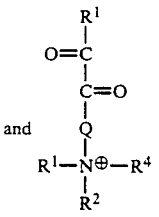

wherein $R^1$ represents a member selected from the group consisting of a hydrocarbon and lower alkyl radical having 1 to 6 carbon atoms, for example, methyl, ethyl and n-hexyl radicals; $R^2$, $R^3$ and $R^4$ represent respectively and independently from each other, a member selected from the group consisting of alkyl radicals having 1 to 6 carbon atoms, and aralkyl radicals having 7 to 10 carbon atoms; the $R^2$ and $R^3$ in the formula (I) and the $R^2$, $R^3$ and $R^4$ in the formula (II) may form together with the nitrogen atom a closed ring structure, Q represents a divalent organic radical having 1 to 20 carbon atoms, and $X^{\ominus}$ represents an anion.

In the formula (I) and (II), the alkyl and aralkyl radicals represent by $R^2$, $R^3$ and $R^4$ include substituted and unsubstituted alkyl and aralkyl radicals. The unsubstituted alkyl radicals include, for example, methyl, ethyl, n-propyl, and n-hexyl radicals. The substituted alkyl radicals include, for example, hydroxyalkyl radicals, for example, 2-hydroxyethyl, 2-hydroxypropyl, and 3-chloro-2-hydroxypropyl radicals; alkoxyalkyl radicals, for example, methoxymethyl and 2-methoxyethyl radicals; cyanoalkyl radicals, for example, 2-cyanoethyl radical, halogenated alkyl radicals, for example, 2-chloroethyl radicals, allyl radicals, 2-butenyl radicals, and propagyl radicals.

The unsubstituted aralkyl radicals include, for example, benzyl, phenetyl, and diphenylmethyl radicals. The substituted aralkyl radicals include, for example, alkyl aralkyl radicals, for example, 4-methylbenzyl and 2,5-dimethyl benzyl radicals, alkoxyaralkyl radicals, for example, 4-methoxybenzyl radical, cyanoaralkyl radicals, for example, 4-cyanobenzyl radical, and halogenated aralkyl radicals, for example, 4-chlorobenzyl radicals.

The ring structures formed by the nitrogen atom and the $R^2$ and $R^3$ radicals in the formula (I) or by the nitrogen atom and the $R^2$, $R^3$ and $R^4$ radicals include pyrrolidine, piperidine and morpholine structures containing the fused $R^2$ and $R^3$ and imidazol, 2-methylimidazol, triazol, pyridine, 2-methylpyridine, 3-methylpyridine, 4-methylpyridine and quinoclidine structures containing the fused $R^2$, $R^3$ and $R^4$ radicals.

The divalent organic radicals represented by Q in the formulae (I) and (II) include alkylene radicals, for example, methylene and ethylene radicals; arylene radicals, for example, radicals of the formulae

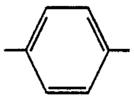

and

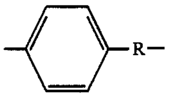

wherein R represents an alkylene radical having 1 to 6 carbon atoms; radicals of the formula $-O-R^5-$, wherein $R^5$ represents an alkylene having 1 to 6 carbon atoms, for example, radicals of the formulae of $-O-CH_2CH_2-$, $-O-CH_2CH_2CH_2-$,

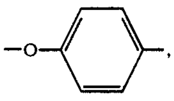, 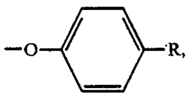

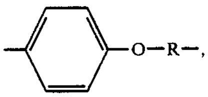

wherein R is as defined above,

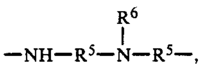

wherein $R^5$ is as defined above and $R^6$ represents a member selected from alkyl radicals having 1 to 6 carbon atoms and aralkyl radicals having 7 to 12 carbon atoms,

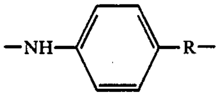 and

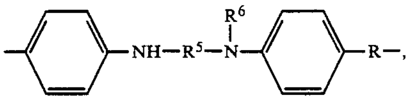

wherein R and $R^6$ are respectively as defined above.

Particularly preferable cationic monomers for the present invention are those of the formulae (I) and (II) wherein $R^1$ represents a methyl radical, $R^2$ and $R^3$ and $R^4$ represent respectively and independently from each other, a member selected from the group consisting of methyl, ethyl and propyl radicals, Q represents a radical of the formula $-OCH_2CH_2-$, and $X^{\ominus}$ represents an anion.

The cationic copolymer of the present invention optionally contains an additional copolymerization component comprising at least one polymerizable non-ionic comonomer different from the fatty acid vinyl esters.

The non-ionic comonomer is preferably selected from the group consisting of, for example, acrylonitrile, methacrylonitrile, acrylamide, methacrylamide, methylolacrylamide, methylolmethacrylamide, N-alkylacrylamide, glycidyl acrylate, glycidyl methacrylate, hydroxyethyl acrylate, hydroxyethyl methacrylate, ethylene, vinyl chloride, alkyl acrylates, alkyl methacrylates, diallyl phthalate, alkyleneglycol monoacrylates, alkyleneglycol diacrylates, alkyleneglycol monomethacrylates, and alkyleneglycol methacrylates.

The non-ionic comonomers are not limited to the above-mentioned compounds and can be selected from other compounds, as long as they are copolymerizable with the principal and cationic copolymerization components and are non-ionic.

Also, styrene can be used as a non-ionic comonomer for the additional copolymerization component. When styrene is used, however, preferably the principal copolymerization component (fatty acid vinyl ester) is polymerized and the resultant polymer is then used as a seed and copolymerized with styrene comonomer and the cationic copolymerization component (cationic monomer).

A particularly preferable non-ionic comonomer for the present invention is selected from alkyl acrylates in which the alkyl radical has 1, 2, 4 or 8 carbon atoms, alkyl methacrylates in which the alkyl radical has 1, 2, 4, or 8 carbon atoms, acrylonitrile, acrylamide, methylolacrylamide, glycidyl methacrylate, hydroxyethyl acrylate, hydroxyethyl methacrylate, and ethylene.

The cationic copolymer in the resinous binder preferably contains 50 to 99.95 molar % of the principal copolymerization component (fatty acid vinyl ester) copolymerized with the cationic and additional copolymerization components.

Alternatively, the cationic copolymer in the resinous binder preferably contains 50 to 99.95 molar % of the principal copolymerization component and 49.95 molar % or less of the additional copolymerization component, both of which are copolymerized with the cationic copolymerization component.

In another example of the present invention, the cationic copolymer is a graft-copolymerization product of the principal copolymerization component and the cationic copolymerization component and a graft copolymerization component comprising polyvinyl alcohol.

The cationic graft copolymer usable for the present invention can be prepared by copolymerizing the principal and cationic copolymerization components is a solution of the graft copolymerization component (polyvinyl alcohol) in an aqueous solvent consisting of water, a mixture of water with a low valent aliphatic alcohol or a mixture of water with a lower aliphatic keton, preferably by a radical emulsion polymerization method.

The resultant water-insoluble cationic copolymer contains a large amount of graft copolymer of polyvinyl alcohol-fatty acid vinyl ester-cationic monomer.

The grafted cationic copolymer is advantageous in that the resultant resinous binder exhibits a remarkably enhanced membrane strength and bonding strength to pigment particles, and the resultant coating layer exhibits a greatly improved bonding strength to the substrate sheet. Therefore, the resultant recording sheet containing the grafted cationic copolymer has an excellent surface strength, a superior mechanical strength, and an improved pencil writing property.

In the preparation of the polyvinyl alcohol-grafted cationic copolymer, the graft copolymerization component preferably comprises at least one member selected from the group consisting of polyvinyl alcohols having a degree of saponification of about 85% to about 95% and mixed polyvinyl alcohols having an average degree of saponification of about 85% to about 95%. The mixed polyvinyl alcohols may be a mixture of at least one type of polyvinyl alcohol having a degree of saponification of more than 95%, for example, 100%, and at least one type of polyvinyl alcohol having a degree of saponification of less than 85%, as long as the average degree of saponification of the resultant mixture is within 85% to 95%. The most preferable graft copolymerization component comprises the mixed polyvinyl alcohol having an average degree of saponification of 85% to 95%, because this type of mixed polyvinyl alcohol effectively increases a degree of grafting to the cation copolymer and enhances the bonding and adhering properties of the resultant grafted cation copolymer and the membrane strength of the resultant coating layer.

Also, the coating liquid containing the polyvinyl alcohol-grafted cation copolymer exhibits a greatly improved stability and can be stored over a long period without deterioration.

Generally, the cation copolymer usable for the present invention is preferably selected from those having a primary (glass) transistor temperature of from −40° C. to 60° C.

When the glass transition temperature is less than −40° C., sometimes, the resultant cationic copolymer exhibits a very high viscosity and adhesion property, and thus the resultant coating liquid containing this cationic copolymer as a resinous binder exhibits a reduced workability.

The cationic copolymer having a glass transition temperature higher than 60° C. is sometimes not preferable for the present invention, because the resultant resinous binder comprising this cationic copolymer exhibits an unsatisfactory binding property.

As stated above, the preferable fatty acid vinyl esters for the principal copolymerization component are vinyl acetate, vinyl monochloroacetate, vinyl propionate, and vinyl formate. Also, preferable combinations of two or more of the comonomers different from the cationic comonomers are as follows.

Vinyl acetate and vinyl propionate,
Vinyl acetate and vinyl versatate,
Vinyl acetate and at least one alkyl acrylate in which the alkyl radical has 1, 2, 4 or 8 carbon atoms,
Vinyl acetate and ethylene,
Vinyl acetate, vinyl versatate and at least one alkyl acrylate in which the alkyl group has 1, 2, 4 or 8 carbon atom,
Vinyl acetate and hydroxyethyl acrylate,
Vinyl acetate and hydroxyethyl methacrylate,
Vinyl acetate, at least one alkyl acrylate in which the alkyl group has 1, 2, 4 or 8 carbon atoms, and hydroxyethyl acrylate, and
Vinyl acetate, at least one alkyl acrylate in which the alkyl group has 1, 2, 4 or 8 carbon atoms, and hydroxyethyl methacrylate The coating layer usable for the present invention may contain an additional resinous binder comprising at least one additional binding polymer different from the fatty acid vinyl esters and the cationic comonomers usable for the resinous binder.

The additional resinous binder may be added to the coating liquid in the form of an aqueous solution or an aqueous emulsion.

The additional binding polymer is either water-soluble or water-insoluble and either cationic or non-ionic.

The cationic water-soluble additional binding polymer is preferably selected from the group consisting of, for example, cationic starches, for example, diethylaminoethylated starch, trimethylethylammonium chloride-modified starch, and diethylaminoethyl ammonium-methyl chloride salt-modified starch; cation-modified polyvinyl alcohols; and cation-modified acrylic ester copolymers.

The non-ionic, water-soluble additional binding polymer is preferably selected from the group consisting of, for example, polyvinyl alcohol, hydroxyethyl cellulose, methyl cellulose, dextrin, pluran, starch, gum arabic, dextran, polyethylene glycol, polyvinyl pyrrolidone, polyacrylamide, and polypropylene glycol.

The water-insoluble or poorly water-soluble additional binding polymer which is used in the form of an aqueous emulsion, is preferably selected from acrylic and methacrylic copolymer resins, for example, methyl methacrylate-butyl acrylate copolymer resins, methyl methacrylate-ethyl acrylate copolymer resins, methyl methacrylate-2-ethylhexyl acrylate copolymer resins, methylmethacrylate-methyl acrylate copolymer resins, styrene-butyl acrylate copolymer resins, styrene-2-ethylhexyl acrylate copolymer resins, styrene-ethyl acrylate copolymer resins, styrene-methylacrylate copolymer resins, methyl methacrylate-styrene-butyl acrylate copolymer resins, methyl methacrylate-styrene-2-ethylhexyl acrylate copolymer resins, methyl methacrylate-styrene-ethyl acrylate copolymer resins, methyl methacrylate-styrene-methyl acrylate copolymer resins, styrene-butyl acrylate-acrylonitrile copolymer resins, and styrene-ethyl acrylate-acrylonitrile copolymer resins.

The additional resinous binder is used to increase the mechanical strength of the resultant coating layer and the storage-stability and coating-workability of the coating liquid for forming the coating layer, and to enhance the clarity and distinctiveness of the images or letters formed on the resultant recording sheet.

The pigment usable for the coating layer of the recording sheet of the present invention is selected from white pigments having a high oil absorption and an excellent color-developing property. A preferable white pigment is finely divided silica. The finely divided silica may be used in combination with at least one member selected from kaolin, clay, talc, zeolite, deposited calcium carbonate, heavy calcium carbonate, aluminum hydroxide and organic white pigments, for example, plastic pigments.

The coating layer of the recording sheet of the present invention may contain a water-proof agent for the images formed on the coating layer. The image water-proof agent preferably comprises a cationic water-soluble polymeric substance.

The cationic water-soluble polymeric substance usable as the image water-proof agent preferably has a high degree of cation-modification and is selected from, for example, polyethyleneimine, quaternary ammonium salt thereof, homopolymers of the afore-mentioned cationic monomers usable for the cationic copolymers of the present invention, and copolymers of the afore-mentioned cationic monomers with other cationic monomers or the non-ionic monomers.

The cationic polymeric substances usable as the image water-proof agent must be water-soluble. The image water-proof agent is different in this feature from the water-insoluble cationic copolymers of the present invention.

The substrate sheet usable for the recording sheet of the present invention comprises a natural pulp paper sheet, and artificial paper sheet, for example, plastic resin sheet, for example, a polypropylene, polyethylene or polyester sheet, synthetic pulp paper sheet, synthetic fiber paper sheet, surface-modified paper-like sheet made from a plastic resin film by a surface-treating, surface-coating or pigment-embedding method, and a composite sheet consisting of two or more of the above-mentioned sheets.

The substrate sheet preferably has a thickness of 10 to 200 μm and a weight of 20 to 200 $g/m^2$. Also, the substrate sheet preferably has an excellent surface smoothness.

The ink jet recording sheet of the present invention is obtained by coating at least one surface of the substrate sheet with an aqueous coating liquid which contains at least a resinous binder and a pigment dispersed in the resinous binder, and dry-solidifying the resultant layer of the aqueous coating liquid to form a coating layer on the substrate sheet surface.

The coating liquid comprises the resinous binder, pigment and, optionally, an additional resinous binder, an image water-proof agent and/or an additive, and is in the form of an aqueous dispersion.

The coating procedure can be carried out by an usual coating method, for example, air-knife coating method, roll coating method, blade coating method, mayer bar coating method, curtain coating method, and die coating method.

The dry-solidifying procedure can be carried out by a usual method, for example, room temperature air drying method, hot air drying method, heating surface-contact drying method or heat radiation drying method.

EXAMPLES

The present invention will be further explained in the following examples, which are only representative and do not restrict the scope of the present invention.

In the examples, all of the expressions "parts" are based on weight.

Also, in the examples, the resultant recording sheets were subjected to the following tests to evaluate the performances of the sheets.

(A) Ink absorption

To evaluate the ink-absorbing property of the recording sheet, a time (in seconds) needed to completely dry dotted ink images formed on the recording sheet by using a printer, was measured. The shorter the necessary drying time, the higher the ink absorption.

(B) Brightness of color

Colors of images formed by yellow, magenta and cyanin inks on the recording sheet were observed by the naked eye, and the brightness of the colors was evaluated.

(C) Form of ink dot

The form of a dot formed with the ink on the recording sheet by using an ink jet printer was observed and evaluated through a microscope.

(D) Surface strength

The surface strength of the recording sheet was determined by hand-writing with a pencil having a hardness of H13 and evaluating the difficulty of handwriting.

(E) Light fastness

The light fastness of the printed ink images on the recording sheet was determined by radiating light to the ink images, and evaluating the degree of color fading of the images.

(F) Stability of coating liquid

It was observed whether or not the coating liquid coagulates during storage. Also, changes in viscosity of the coating liquid with the lapse of time were measured.

Example 1

Preparation of cationic copolymer emulsion (1)

A reaction flask was charged with 268 parts of a 15% aqueous solution of a polyvinyl alcohol having a degree of saponification of 88 molar %, with 104 parts of a mixture of a nonylphenol-ethylene oxide addition type non-ionic emulsifying agent and a quaternary ammonium salt type cationic emulsifying agent and then with 971 parts of water. The mixture in the flask was heated at a temperature of 70° C. while stirring to provide a uniform aqueous solution.

Then, 995 parts of a principal copolymerization component consisting of vinyl acetate were evenly mixed with 5 parts by a cationic copolymerization component consisting of dimethylaminoethyl methacrylate in a dropping funnel by stirring.

An additional amount of the catalyst was prepared by dissolving 2.5 parts of potassium persulfate in 160 parts of water in a dropping funnel.

The solution in the flask was added with 0.6 part of a polymerization catalyst consisting of potassium persulfate. Then, the mixture in the dropping funnel was gradually added dropwise to the solution in the flask over about 4 hours.

At the same time as the addition of the copolymerization component mixture, the additional catalyst solution in the dropping funnel was added dropwise to the solution in the flask over about 4 hours, to initiate a copolymerization reaction.

After the compression of the addition procedure of the copolymerization component mixture, the copolymerization reaction was continued for 2 hours to complete the reaction.

As a result, a cationic copolymer emulsion containing a cationic copolymer consisting of 99.73 molar % of the vinyl acetate component and 0.27 molar % of the dimethylaminoethyl methacrylate component was obtained. The emulsion had a solid content of 45% by weight.

Preparation of ink jet recording sheet

An aqueous dispersion was prepared by dispersing 100 parts of fine silicic acid particles and 1.5 parts (by solid weight) of a dispersing agent consisting of polysodium acrylate in water in an amount necessary to adjust the solid content of the dispersion to 25% by weight, and then stirred at a high speed.

The aqueous dispersion was mixed with 20 parts (by solid weight) of polyvinyl alcohol having a degree of saponification of 100% and 30 parts (by solid weight) of the cationic copolymer emulsion (1) to provide an aqueous coating liquid having a solid content of 15% by weight.

The coating liquid was applied in an amount of 5 $g/m^2$ of solid weight to a surface of a high quality paper sheet having a weight of 64 $g/m^2$ and the resultant layer of the coating liquid was dried to form an ink jet recording sheet.

The resultant recording sheet was subjected to the above-mentioned tests.

The results are shown in Table 1.

Example 2

Preparation of cationic copolymer emulsion (2)

The same procedures for the preparation of the cationic copolymer emulsion as mentioned in Example 1 were carried out except that the 15% aqueous solution of the polyvinyl alcohol having a degree of saponification of 88 molar % was mixed in an amount of 167 parts with the emulsifying agent mixture and 1300 parts of water was added to the resultant mixture.

The resultant cationic copolymer emulsion (2) contained 45% by solid weight of a cationic copolymer composed of 99.73 molar % of the vinyl acetate component and 0.27 molar % of the dimethylaminoethyl methacrylate.

Preparation of ink jet recording sheet

The same procedures for the preparation of the jet ink recording sheet as mentioned in Example 1 were carried out except that 30 parts (by solid weight) of the cationic copolymer was mixed with 100 parts of the pigment consisting of fine silicic acid particles and 20 parts (by solid weight) of an aqueous emulsion of an additional resinous binder consisting of an acrylic acid ester copolymer.

The resultant aqueous emulsion was used as a coating liquid.

The results of the tests applied to the resultant recording sheet are shown in Table 1.

Example 3

The same procedures as those described in Example 1 were carried out except that the coating liquid was prepared from 100 parts of fine silica particles, 30 parts (by solid weight) of the completely saponified polyvinyl alcohol, 30 parts (by solid weight) of the cationic copolymer emulsion (1) of Example 1, and 10 parts (by solid weight) of a cationic, water-soluble image waterproof agent consisting of a polyethyleneimine.

The results of the tests applied to the recording sheet are shown in Table 1.

Example 4

Preparation of cationic copolymer emulsion (3)

The same procedures as mentioned in Example 1 were carried out except that the polyvinyl alcohol was not used but the non-ionic emulsifying agent-cationic emulsifying agent mixture was used, and an amount of 1150 parts of water was added.

The resultant cationic copolymer emulsifier (3) contained 45% (by solid weight) of a cationic copolymer composed of 99.73 molar % of the vinyl acetate component and 0.27 molar % of the dimethylaminoethyl methacrylate component.

Preparation of ink jet recording sheet

The same procedures as described in Example 1 were carried out except that the cationic copolymer emulsion (3) was used for the cationic copolymer emulsion (1).

The results of the tests applied to the resultant recording sheet are shown in Table 1.

Comparative Example 1

The same procedures as described in Example 1 were carried out except that the coating liquid was prepared by dispersing 100 parts of fine silica acid particles and by dissolving 30 parts (by solid weight) of polyvinyl alcohol in water, and had a solid content of 15% by weight.

The results of the tests applied to the resultant comparative recording sheet are shown in Table 1.

Comparative Example 2

The same procedures as described in Example 1 were carried out except that the coating liquid was prepared by dispersing and dissolving 100 parts of fine silicic acid particles and 20 parts (by solid weight) of a cationic copolymer emulsion containing a cationic copolymer composed of 98.3 molar % of the vinyl acetate component and 1.7 molar % of the dimethylaminoethyl methacrylate component in water, and had a solid content of 10% by weight.

The results of the tests applied to the resultant comparative recording sheet are shown in Table 1.

Comparative Example 3

The same procedures as described in Example 1 were carried out except that, in the preparation of the coating liquid, 30 parts (by solid weight) of the cationic copolymer emulsion was replaced by 30 parts (by solid weight) of a polyvinyl acetate emulsion having a solid content of 45% by weight. In the preparation of the polyvinyl acetate emulsion, the cationic emulsifying agent was not used and the non-ionic emulsifying agent was used in an amount of 104 parts.

The results of the tests applied to the resultant comparative recording sheet are shown in Table 1.

Example 5

The same procedures as those described in Example 1 were carried out, with the following exception.

In the preparation of the cationic copolymer emulsion, the vinyl acetate principal copolymerization component was used in an amount of 995 parts, and the cationic copolymerization component consisted of 5 parts of dimethylaminoethyl methacrylate-methyl chloride salt.

The resultant cationic copolymer emulsion (4) contained 45% (by solid weight) of a cationic copolymer composed of 99.78 molar % of the vinyl acetate component and 0.22 molar % of the dimethylaminoethyl methacrylatemethylchloride salt component.

The results of the tests applied to the recording sheet are shown in Table 1.

Example 6

Preparation of cationic copolymer emulsion (5)

A flask was charged with 13 parts of a mixture of a nonylphenol-ethylene oxide addition type non-ionic emulsifying agent and a quaternary ammonium salt type cationic emulsifying agent, and 1380 parts of water. The mixture in the flask was heated at a temperature of 70° C. while stirring, to provide a solution of the mixed emulsifying agent.

The same copolymerization procedures as described in Example 1 were carried out except that the abovementioned solution of the mixed emulsifying agent was used, the principal copolymerization component consisted of 500 parts of vinyl acetate, the cationic copolymerization component consisted of 5 parts of dimethylaminoethyl methacrylate, and an additional copolymerization component consisting of 495 parts of butyl acrylate was added.

The resultant cationic copolymer emulsion (5) contained 45% (by solid weight) of a cationic copolymer composed of 59.87 molar % of the vinyl acetate component, 39.8 molar % of the butyl acrylate component 0.33 molar % of the dimethylaminoethyl methacrylate.

Preparation of ink jet recording sheet

The same procedures as described in Example 1 were carried out except that the cationic copolymer emulsion (1) was replaced by the above-mentioned cationic copolymer emulsion (5).

The results of the tests applied to the resultant recording sheet are shown in Table 1.

Example 7

Preparation of cationic copolymer emulsion (6)

An emulsifying agent solution was prepared by dissolving 130 parts by a mixture of a nonylphenol ethylene oxide addition type non-ionic emulsifying agent and a quaternary ammonium salt type cationic emulsifying agent in 1380 parts of water in a flask at a temperature of 70° C. while stirring the mixture.

A mixture of copolymerization components was prepared in a dropping funnel from 800 parts of vinyl acetate, 195 parts of vinyl versatate and 5 parts of dimethylaminoethyl methacrylate by mixing and stirring.

The same copolymerization procedures as mentioned in Example were carried out except that the above-mentioned mixed emulsifying agent solution and copolymerization components were used.

The resultant cationic copolymer emulsion (6) contained 45% (by solid weight) of a cationic copolymer composed of 90.14 molar % of the vinyl acetate component, 9.55 molar % of the vinyl versatate component and 0.31 molar % of the dimethylaminoethyl methacrylate component.

Preparation of ink jet recording sheet

The same procedures as mentioned in Example 1 were carried out except that the cationic copolymer emulsion (1) was replaced by the cationic copolymer emulsion (6).

The results of the tests applied to the resultant recording sheet are shown in Table 1.

Comparative Example 4

The same procedures as those described in Example 1 were carried out with the following exception.

The coating liquid was prepared from 100 parts of fine silica particles, 30 parts of polyvinyl alcohol, 30 parts (by solid weight) of the same non-ionic vinyl acetate copolymer emulsion as mentioned in Comparative Example 3 and 10 parts of polyethyleneimine (cationic, water-soluble, image water-proof agent).

The results of the tests applied to the resultant comparative recording sheet are shown in Table 1.

TABLE 1

| Example No. | Item | Weight of coating layer ($g/m^2$) | Ink absorption | Distinctiveness of color image | Shape of dots | Workability of pencil writing | Light fastness | Stability of coating liquid |
|---|---|---|---|---|---|---|---|---|
| Example | 1 | 5 | 4 | 5 | 4 | 5 | 5 | 5 |
| | 2 | 5 | 5 | 4 | 5 | 4 | 4 | 3 |
| | 3 | 5 | 4 | 4 | 4 | 5 | 3 | 4 |
| | 4 | 5 | 4 | 4 | 4 | 4 | 4 | 2 |
| Comparative | 1 | 5 | 2 | 2 | 2 | 4 | 3 | 3 |
| | 2 | 5 | 2 | 2 | 3 | 2 | 2 | 1 |
| Example | 3 | 5 | 2 | 2 | 3 | 1 | 3 | 1 |
| Example | 5 | 5 | 5 | 5 | 5 | 4 | 3 | 2 |
| Comparative Example | 4 | 5 | 2 | 2 | 2 | 1 | 1 | 1 |
| Example | 6 | 5 | 5 | 5 | 5 | 5 | 5 | 5 |
| | 7 | 5 | 5 | 5 | 5 | 5 | 5 | 5 |

Note:

TABLE 1-continued

| Class | Evaluation |
|---|---|
| 5 | Excellent |
| 4 | Very good |
| 3 | Good (satisfactory) |
| 2 | Poor |
| 1 | Very poor |

As Table 1 clearly indicates, the ink jet recording sheets of the present invention exhibit an excellent ink absorption, clarity and distinctiveness, and color images, and the form of the dots, had a high surface strength and thus an excellent pencil writing property, an excellent light fastness and a satisfactory storage stability of the coating liquid.

Therefore, the recording sheets of the present invention are useful for forming clear printed images thereon at a high resolving power at a high industrial efficiency even when a high speed ink jet full color printer is used.

We claim:

1. An ink jet recording sheet comprising:

a substrate sheet; and at least one coating layer formed on at least one surface of the substrate sheet and comprising a resinous binder and at least a pigment dispersed in the resinous binder, said resinous binder comprising at least one cationic copolymer which is a copolymerization product of:

(a) 99.95 molar % or less of a principal copolymerization component comprising at least one fatty acid vinyl ester comonomer; with at least (b) 0.05 to 0.4 molar % of a cationic copolymerization component comprising at least one cationic comonomer having at least one ethylenically unsaturated hydrocarbon radical and at least one cationic radical selected from the group consisting of tertiary amino radicals and quaternary ammonium radicals.

2. The recording sheet as claimed in claim 1, wherein the weight of the coating layer is 1 to 50 $g/m^2$.

3. The recording sheet as claimed in claim 1, wherein an amount of the resinous binder is 20 to 50% based on the weight of the coating layer.

4. The recording sheet as claimed in claim 1, wherein an amount of the cationic copolymer is 5 to 50% based on the weight of the coating layer.

5. The recording sheet as claimed in claim 1, wherein a content of the cationic copolymer in the resinous binder is 10 to 100% by weight.

6. The recording sheet as claimed in claim 1, wherein the fatty acid vinyl ester comonomer is selected from the group consisting of vinyl formate, vinyl acetate, vinyl monochloroacetate, vinyl propionate and vinyl esters of fatty acids having 4 to 24 carbon atoms.

7. The recording sheet as claimed in claim 1, wherein the cationic comonomer is selected from the compounds of the formulae (I) and (II):

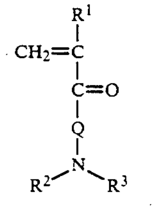

(I) and

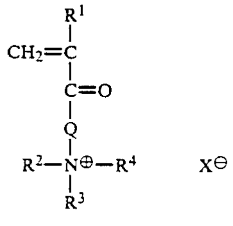

wherein $R^1$ represents a methyl radical, $R^2$, $R^3$ and $R^4$ represent respectively and independently from each other, a member selected from the group consisting of methyl, ethyl and propyl radicals, Q represents a radical of the formula $—OCH_2CH_2—$ and $X^{\ominus}$ represents an anion.

8. The recording sheet as claimed in claim 1, wherein the cationic copolymer contains 50 molar % or more of the principal copolymerization component and 49.95 molar % or less of an additional copolymerization component comprising at least one non-ionic polymerizable comonomer different from the fatty acid vinyl ester comonomer, which principal and additional components are copolymerized with the cationic copolymerization component.

9. The recording sheet as claimed in claim 8, wherein the non-ionic polymerizable comonomer is selected from the group consisting of acrylonitrile, methacrylonitrile, acrylamide, methacrylamide, methylolarylamide, methylolmethacrylamide, N-alkylacrylamide, glycidyl acrylate, glycidyl methacrylate, hydroxyethyl acrylate, hydroxyethyl methacrylate, ethylene, vinyl chloride, acrylic acid alkyl esters, methacrylic acid alkyl esters, dialkyl phthalate, alkyleneglycol monoacrylates, alkyleneglycol diacrylates, alkyleneglycol monomethacrylates, alkyleneglycol dimethacrylates and styrene.

10. The recording sheet as claimed in claim 1, wherein the cationic copolymer is selected from graft copolymers of the principal copolymerization component with the cationic copolymerization component and a graft copolymerization component consisting of polyvinyl alcohol.

11. The recording sheet as claimed in claim 1, wherein the coating layer further contains at least one cationic, water-soluble polymeric substance.

12. The recording sheet as claimed in claim 1, wherein the cationic copolymer in the coating layer has a glass transition temperature of from −40° C. to 60° C.

13. The recording sheet as claimed in claim 1, wherein the pigment comprises fine silica particles.

14. A process for producing an ink jet recording sheet comprising the steps of:

coating at least one surface of a substrate sheet with an aqueous coating liquid containing a resinous binder and a pigment; and dry-solidifying the resultant layer of the aqueous coating liquid to provide a coating layer on the substrate sheet surface, said resinous binder comprising at least one cationic copolymer which is a copolymerization product of:

(a) 99.95 molar % or less of a principal copolymerization component comprising at least one fatty acid vinyl ester comonomer; with at least (b) 0.05 to 0.4 molar % of a cationic copolymerization component comprising at least one cationic comonomer having at least one ethylenically unsaturated hydrocarbon radical and at least one cationic radical selected from the group consisting of tertiary amino radicals and quaternary ammonium radicals.

15. The process as claimed in claim 14, wherein the cationic copolymer is a polyvinyl alcohol-grafted cationic copolymer prepared by graft-copolymerizing the principal copolymerization component with the cationic copolymerization component in an aqueous solution of polyvinyl alcohol.

* * * * *